Figure 1:
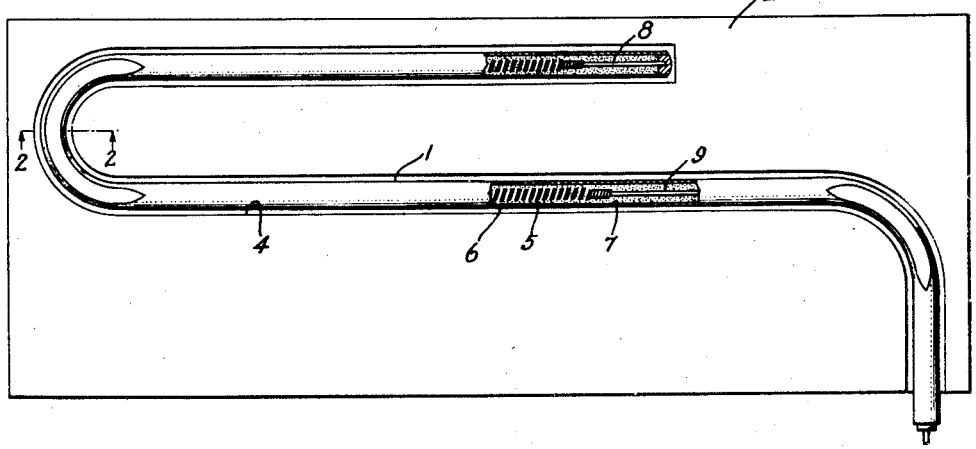

Inventors:
Oliver G. Vogel,
Louis Ziffrin,
by Alfred V. Bobst
His Attorney.

Patented May 10, 1949

2,469,801

UNITED STATES PATENT OFFICE 2,469,801

ELECTRIC HEATER

Oliver G. Vogel, Oak Park, and Louis Ziffrin, Westchester, Ill., assignors to Hotpoint Inc., a corporation of New York Application December 3, 1945, Serial No. 632,432

6 Claims. (Cl. 201—67)

This invention relates to electric heaters, more particularly to electric heaters of the sheathed type, and it has for its object improvements in heaters of this character.

More particularly, this invention relates to heaters of the sheathed type having a resistance conductor housed within a metallic sheath and embedded in and supported in spaced relation with the sheath by a compacted mass of electrically insulating and heat conducting material, such as magnesium oxide. And it contemplates improvements in heating elements of this character whereby the element can be readily brazed to a metallic structure for the purpose of applying heat to it.

In certain heating installations it has been found desirable to attach a sheathed heating element to a metallic structure for the purpose of heating it. Brazing is a convenient and economical way to do this, and furthermore, it effects an efficient connection between the heating element and the metal structure.

Sheathed heaters made in accordance with the United States patent to J. C. Sharp No. 2,034,539, dated March 17, 1936 are excellent heaters from the standpoint of long life, temperature considerations, etc., but considerable difficulty was experienced when the sheath was brazed to metallic structures, such as grooved castings. This is because the common commercial brazing alloys, known as silver brazing alloys and made of silver, copper, and zinc in varying proportions, penetrates the sheath along the grain boundaries, and thereby causes general inter-granular disintegration with resultant loss of cohesive strength in the sheath alloy. Such sheath defects cause immediate or premature electrical failures.

This invention contemplates an improved sheath heater of the type described and claimed in the aforementioned Sharp patent having means which protects the sheath from the intercrystalline rupture caused by the penetration of the brazing alloy in the grain boundaries, and at the same time provide a surface on the sheath that will readily accept the brazing alloy in an efficient manner.

In accordance with this invention, we provide a coating of chromium on the exterior surface of the sheath, and also a layer of copper superimposed upon this coating. By reason of this arrangement we have found that this heater may be brazed with the common silver brazing alloys without the alloys in any way penetrating the sheath. On the contrary, when the sheath has been brazed, we have found that the chromium protecting layer remains intact in its bonded relation with the sheath, while the copper layer diffuses into the brazing alloys. In other words, once the sheath has been brazed the copper layer as such disappears, but the chromium layer remains as a barrier between the sheath and the brazing material.

Figure 2:
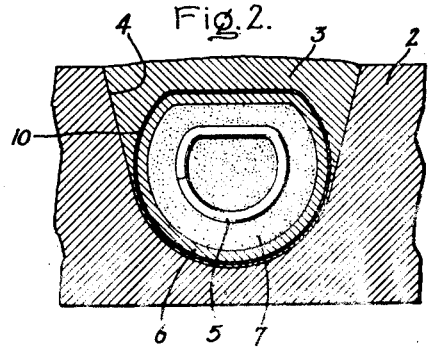

For a more complete understanding of this invention, reference should be had to the accompanying drawing in which Fig. 1 is a vertical elevation of an electrically sheathed heating element embodying this invention and brazed to a metallic structure, but having the brazing material removed and parts shown in section so as to illustrate certain structural details; and Fig. 2 is a sectional view taken through the line 2—2 of Fig. 1, and drawn to a larger scale than Fig. 1.

Referring to the drawing, this invention has been shown as applied to an electrically sheathed heater 1 which is attached to a metallic structure 2 by means of a brazing alloy 3. Preferably and as shown, the metallic structure 2 will be provided with a channel or recess 4 in which the sheathed heater is mounted, and the brazing material 3 will completely surround the heater.

The sheathed heater, as indicated before, is made in accordance with the aforementioned Sharp patent. It comprises a helical resistance conductor 5 mounted within a tubular metallic sheath 6, and is embedded in and held in spaced relation with reference to the sheath by a mass 7 of electrically insulating and heat conducting material, which preferably will be compacted granular magnesium oxide. Attached to the opposite ends of the conductor 5 are terminals 8 and 9. The terminal 8 is mounted within one end of the sheath, as shown, and it is grounded to this end of the sheath. The terminal 9 which is mounted in the other end of this sheath projects from the sheath, as shown, whereby an external electrical connection may be made. In the particular application of the invention illustrated, the heating unit is formed roughly in the shape of a hairpin, and the end of the heater having the terminal 9 is bent outwardly at right angles to the adjoining leg, as shown. Preferably, the bent portions of the heater will be flattened in accordance with the United States patent to O. G. Vogel No. 2,094,480, dated September 28, 1937.

It is to be understood that while a heater has been shown in the drawing having one terminal 8 grounded to the sheath, this terminal may be a live one as is the terminal 9. In such case, of course, it will clear the metal body 2 as does terminal 9.

The sheath 6, as fully described in the aforementioned Sharp patent, is made of a nickel-chromium-iron alloy having an important nickel content of 30% to 80%, and a chromium content of 10% to 20%. One of the alloys of this patent which has proved to be quite satisfactory in the particular application disclosed consists of approximately 14% chromium, 6% iron and the remainder chiefly nickel.

When attempts were made to braze this alloy with the commercially available silver brazing alloys having varying proportions of silver, copper and zinc, ranging from 20% to 65% silver, 45% to 20% copper and 35% to 15% zinc, it was found that the sheath was rendered defective. It appears that this happened because the brazing alloy penetrated the grain boundaries of the sheath, and as pointed out above, the metal was destroyed due to inter-crystalline ruptures. Such failures are rapidly accelerated under conditions of stress either mechanical or thermal, which stress may be of a low order of magnitude, and they resulted in immediate electrical failures in some cases and premature failures in others.

In order to obviate these sheath failures and at the same time provide a sheath surface which will readily accept the brazing material, we first cover the sheath with a coating of chromium; and preferably we do this by depositing the chromium onto the sheath by a suitable electroplating process. The thickness of the chromium coating is not critical, but a chromium thickness of approximately .0001 inch is satisfactory. The sheath with this layer of chromium will prevent inter-granular penetration of a brazing alloy. However, the brazing operation, as usually performed, would be very difficult to do because of the tendency of the chromium to oxidize and thereby prevent the brazing alloy from wetting or making close contact with the surface of the heater. Accordingly, after applying the chromium coating to the sheath, we superimposed upon this chromium coating a second coating of copper which coating also preferably will be provided by depositing the copper onto the chromium by means of a suitable electroplating process. The thickness of the copper coating also is not critical but we prefer it to range between .003 and .005 inch.

We have found that when this heater is brazed by the silver brazing alloys aforementioned that the chromium coating remains intact about the sheath (this layer being indicated by the numeral 10 in Fig. 2), while the copper coating diffuses into the brazing alloy. The chromium plating which remains undisturbed is an effective barrier against the penetration of the brazing alloy into the sheath.

While we have shown and described a particular embodiment of our invention, it will be obvious to those skilled in the art that various changes and modifications may be made without departing from my invention in its broader aspects and we therefore aim in the appended claims to cover all such changes and modifications as fall within the true spirit and scope of our invention.

What we claim as new and desire to secure by Letters Patent of the United States is:

1. An electric heater of the sheathed type for application to a metallic element by brazing it thereto by a brazing substance comprising, a resistance conductor, a metallic sheath housing said conductor formed of a nickel-chromium-iron alloy having a major nickel component, a coating of chromium superimposed upon and bonded to the outer surface of said sheath and having a thickness sufficient to prevent intergranular penetration of the brazing substance in the liquid phase with respect to said sheath, and a coating of copper superimposed upon and bonded to said coating of chromium in order to accommodate ready bonding with the brazing substance.

2. An electric heater of the sheathed type for application to a metallic element by brazing it thereto by a brazing compound comprising, a resistance conductor, a metallic sheath housing said conductor formed of an alloy consisting of at least 10% to 20% chromium, at least 30% to 80% nickel, the combined nickel and chromium content being at least 50% of said alloy, and the remainder of said alloy being chiefly iron, a coating of chromium bonded to the exterior surface of said sheath and having a thickness sufficient to prevent intergranular penetration of the brazing compound in the liquid phase with respect to said sheath, and a coating of copper superimposed on and bonded to said chromium coating in order to accommodate ready bonding with the brazing compound.

3. An electric heater of the sheathed type for application to a metallic element by brazing it thereto by a brazing compound comprising, a resistance conductor, a metallic sheath housing said conductor formed of an alloy consisting of approximately 14% chromium, 6% iron and the remainder chiefly of nickel, a layer of chromium coating the exterior surface of said sheath and having a thickness sufficient to prevent intergranular penetration of the brazing compound in the liquid phase with respect to said sheath, and a layer of copper superimposed on said chromium layer in order to accommodate ready bonding with the brazing compound.

4. An electric heater comprising a metallic body, a sheathed heating unit having a resistance conductor and a metallic sheath encasing said conductor formed of a nickel-chromium-iron alloy having an important nickel component, an inner coating of chromium bonded to said sheath, an outer coating of copper bonded to said inner coating, and a layer of brazing alloy bonded both to said body and into said outer coating to said inner coating and securing said body and said sheath in good heat exchange relation.

5. An electric heater comprising a metallic body, a heating unit having a resistance conductor and a metallic sheath housing said conductor, said sheath being formed of an alloy consisting of at least 10% to 20% chromium, about 30% to 80% nickel, the combined nickel and chromium content being at least 50% of said alloy and the remainder thereof being chiefly iron, an inner coating of chromium bonded to said sheath, an outer coating of copper bonded to said inner coating, and a layer of brazing alloy bonded both to said body and into said outer coating to said inner coating and securing said body and said sheath in good heat exchange relation.

6. An electric sheathed heater capable of being brazed with a silver brazing alloy comprising, a resistance conductor, a metallic sheath housing said conductor formed of an alloy consisting of at least 10% to 20% chromium, at least 30% to 80% nickel, the combined nickel and chromium content being at least 50% of said alloy, and the remainder of said alloy being chiefly iron, a coating of chromium bonded to the exterior surface of said sheath and having a thickness sufficient to prevent intergranular penetration of the brazing alloy in the liquid phase with respect to said sheath, and a coating superimposed on said chromium coating and formed of a material capable of being brazed with the brazing alloy.

OLIVER G. VOGEL.
LOUIS ZIFFRIN.

REFERENCES CITED

The following references are of record in the file of this patent:

UNITED STATES PATENTS

| Number | Name | Date |
|---|---|---|
| 2,023,603 | Lodge | Dec. 10, 1935 |
| 2,034,539 | Sharp | Mar. 17, 1936 |
| 2,145,020 | Becket et al. | Jan. 24, 1939 |
| 2,188,399 | Bieber | Jan. 30, 1940 |
| 2,343,040 | Allen et al. | Feb. 29, 1944 |
| 2,423,184 | Greer | July 1, 1947 |